United States Patent [19]

Thomson et al.

[11] Patent Number: 4,735,353
[45] Date of Patent: Apr. 5, 1988

[54] FRICTION WELDING

[75] Inventors: Allan R. Thomson; Thomas V. Heath, both of Rosshire, Scotland

[73] Assignee: Thomson Welding & Inspection Ltd., Rosshire, Scotland

[21] Appl. No.: 2,718

[22] PCT Filed: May 7, 1986

[86] PCT No.: PCT/GB86/00242
§ 371 Date: Dec. 30, 1986
§ 102(e) Date: Dec. 30, 1986

[87] PCT Pub. No.: WO86/06665
PCT Pub. Date: Nov. 20, 1986

[30] Foreign Application Priority Data

May 10, 1985 [GB] United Kingdom ............... 8511856
Jun. 4, 1985 [GB] United Kingdom ............... 8514114

[51] Int. Cl.$^4$ ............................................. B23K 20/12
[52] U.S. Cl. ................................... 228/112; 228/113; 228/2; 228/44.3
[58] Field of Search .................... 228/112–114, 228/2, 44.3

[56] References Cited

U.S. PATENT DOCUMENTS

| | | | |
|---|---|---|---|
| 3,349,982 | 10/1967 | Lipp et al. | 228/2 |
| 3,616,980 | 11/1971 | Padilla | 228/2 |
| 3,704,821 | 12/1972 | Loyd et al. | 228/2 |
| 3,740,827 | 6/1973 | Hunter et al. | |
| 3,772,765 | 11/1973 | Ditto | |
| 3,882,593 | 5/1975 | Lucas | 228/113 |
| 4,030,658 | 6/1977 | Parrish | |
| 4,132,340 | 1/1979 | Kucklick | |
| 4,213,554 | 7/1980 | Sciaky | 228/2 |
| 4,247,346 | 1/1981 | Maehara et al. | |
| 4,593,848 | 6/1986 | Hochbein | 228/2 |

FOREIGN PATENT DOCUMENTS

| | | | |
|---|---|---|---|
| 2105736 | 9/1971 | Fed. Rep. of Germany | 228/44.3 |
| 1293141 | 10/1972 | United Kingdom | 228/112 |
| 1297847 | 11/1972 | United Kingdom | 228/112 |
| 1006134 | 3/1983 | U.S.S.R. | 228/2 |

Primary Examiner—Nicholas P. Godici
Assistant Examiner—Samuel M. Heinrich
Attorney, Agent, or Firm—Hoffman & Baron

[57] ABSTRACT

A method of friction welding comprising causing relative rotation between a pair of workpieces by actuating first and second drive means, the first drive means being coupled to a primary source of energy, and the second drive means being adapted to store auxiliary energy; bringing the workpieces into contact with one another under pressure, whereby the first and second drive means are adapted together to supply sufficient rotational energy to overcome the effects of resistive torque between the workpieces on initial contact between the workpieces; and thereafter continuing actuation of the first drive means to maintain relative rotation between the workpieces.

13 Claims, 6 Drawing Sheets

FRICTION WELDING

The invention relates to methods and apparatus for friction welding.

In conventional friction welding, relative rotation between a pair of workpieces is caused while the workpieces are urged together. Typically thereafter once sufficient heat is built up between the workpieces relative rotation is stopped and the workpieces are urged together under forging force which may be the same as or greater than the original urging force.

One of the problems with conventional friction welding arises when the two workpieces are initially brought together. At this stage, there is significant dry friction between the workpieces and a considerable increase in energy is required to overcome this dry friction. For example, when welding a 10 mm diameter stud the initial frictional torque may be in the range 30–40 Nm. This problem has been overcome in the past by designing a drive motor capable of supplying sufficient driving torque to overcome dry friction. Such a drive motor is acceptable in relatively stationary friction welding apparatus but is not a satisfactory solution when it comes to the design of portable friction welding apparatus. There is a requirement now to be able to carry out friction welding at the site at which the welded workpieces are to be used. This should be contrasted with prior arrangements in which the workpieces are brought to the friction welding apparatus where they are welded and then are transported back to their position of use. However, drive motors suitable for portable welding apparatus typically have a driving torque of the order of 8 Nm. Thus in the example mentioned, when welding a stud of 10 mm diameter, on touchdown there is a net resistive torque of over 20 Nm. The effect of this is to rapidly decelerate the motor so that the heat of rubbing is reduced and no flux forms. The motor thus stalls before the weld is initiated. The motor rating would therefore need to be increased by a factor of 3 or 4 thus rendering the concept of portability impractable.

In accordance with one aspect of the present invention, a method of friction welding comprises actuating drive means coupled to a primary source of energy to cause relative rotation between a pair of workpieces, the drive means also being coupled to an auxiliary source of energy; and bringing the workpieces into contact with one another under pressure, the auxiliary source of energy being adapted to supply the drive means with sufficient additional energy such that the drive means overcomes the effects of resistive torque between the workpieces on initial contact between the workpieces.

In accordance with a second aspect of the present invention, friction welding apparatus comprises drive means for coupling to a primary source of energy in use and for causing relative rotation between a pair of workpieces; an auxiliary energy store coupled to the drive means; and means for urging the workpieces into contact with one another, the auxiliary store being adapted to supply the drive means with sufficient additional energy such that the drive means overcomes the effects of resistive torque between the workpiece of initial contact between the workpieces in use.

The invention enables a compact, more efficient and much cheaper method and apparatus to be achieved as well as enabling portable friction welding apparatus to be designed. The problem of overcoming the high resistive torque experienced during initial touchdown is dealt with by coupling the drive means to an auxiliary source of energy which supplies additional energy during the touchdown phase. Sufficient additional energy is supplied such that the deceleration of the drive means on initial contact between the workpieces is limited to acceptable limits until the resistive torque has fallen to a level which is substantially equal to or less than the capacity of the drive means. In other words, an equilibrium between the driving torque of the drive means and the resistive torque between the workpieces is reached before the drive means stalls. After this phase, the drive means is capable of supplying unaided the energy requirements of the weld cycle in response to energy from the primary source.

This invention should be contrasted with conventional friction welding systems in which auxiliary energy sources such as flywheels are used. In these conventional systems, the additional inertia is used to supply all the weld energy and so very massive flywheels are required. In the present case, however, this additional inertia is used only to boost the energy supply during the initial phase of welding. In this manner, the capacity of a welding machine is substantially increased compared to a unit relying wholly on the motor power for energy input at the time of welding.

The quantity of inertia employed may be varied depending upon the type of workpieces being welded.

Typically, the method will further comprise the step of stopping relative rotation between the workpieces after sufficient heat is built up at the interface between the workpieces and then urging the workpieces together under forging pressure.

Preferably, the auxiliary store is adapted to store just sufficient (inertial) energy to overcome contact friction at the operating speed of the drive means. This minimises the size of the auxiliary store which is important in the case of portable friction welding apparatus.

Preferably, the auxiliary energy store is coupled to a rotatable portion of the drive means. This coupling may be achieved for example by including a suitable transmission such as one or more belts between the store (such as a rotatably mounted member) and the rotatable portion of the drive means. Conveniently, however, the store comprises a flywheel coupled to a drive shaft of the drive means for rotation with the drive shaft. Conveniently, the flywheel is mounted coaxially on the drive shaft.

The drive means may be provided by any convenient drive motor, but is preferably an air driven motor.

Typically, the apparatus includes a housing supporting the drive means, the drive shaft of the drive means being axially movable relative to the housing, and wherein the flywheel is also axially movable relatively to the housing.

In the case of portable welding apparatus, this may be directly mounted to another workpiece by a clamping arrangement which, where the workpiece is of a ferrous material, may include one or more magnetic members. The magnetic clamping member or members may be permanently magnetised or alternatively may be constituted by one or more electromagnets. This latter arrangement assists in demounting the apparatus after welding.

In the case of non-ferrous workpieces, the welding apparatus may be mounted to the workpiece by a seal defining a closed space which is evacuated.

An example of a method and apparatus in accordance with the present invention will now be described with reference to the accompanying drawings, in which.

Figure 1:
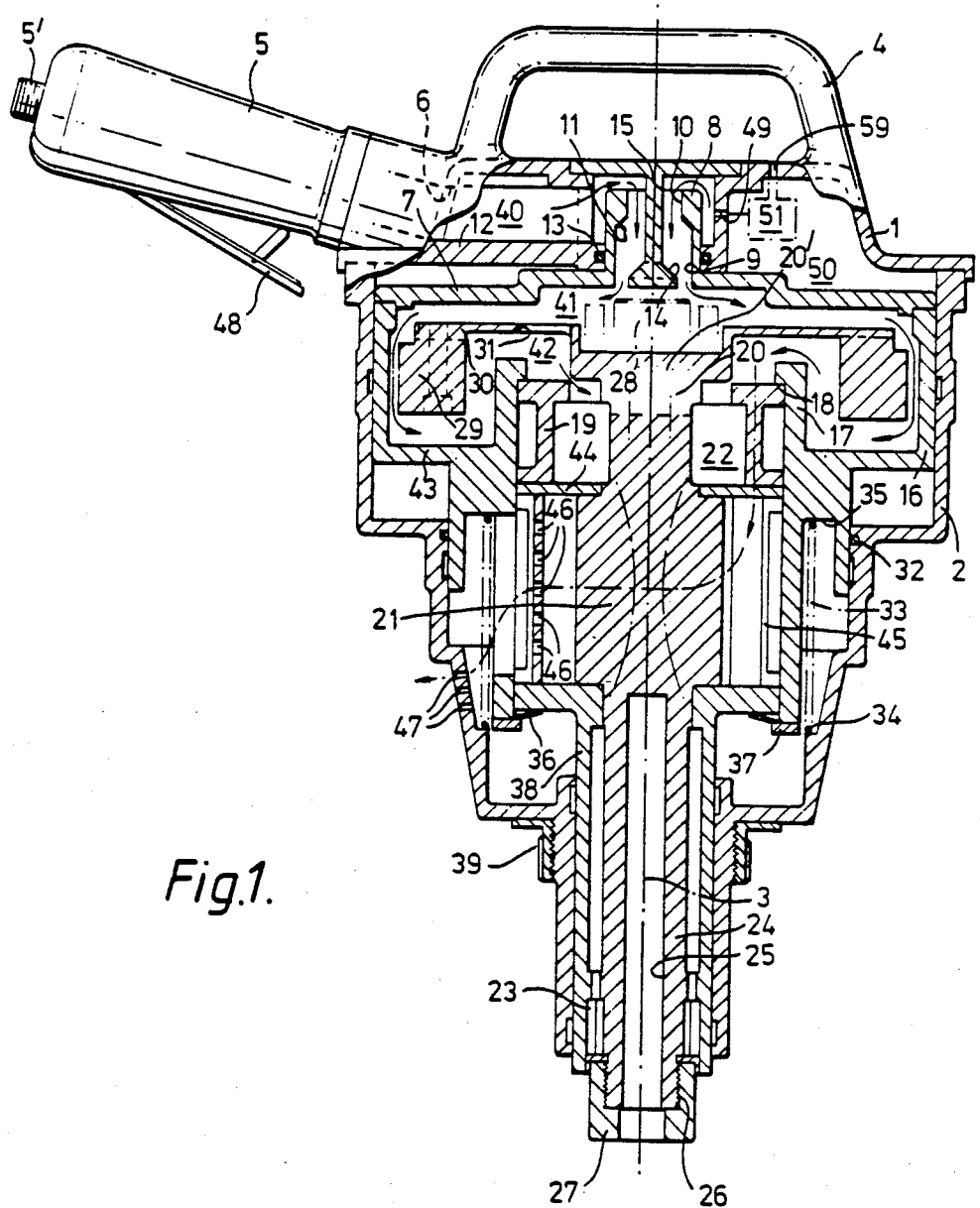
FIG. 1 is a longitudinal, partial cross-section through the portable welding tool in its retracted position.

The portable welding tool shown in the drawings has an outer metal casing having an upper portion 1 secured to a lower portion 2 by bolts (not shown). The tool has a generally circular cross-section centred on an axis 3 and the part 2 of the casing extends in stepwise form towards the axis 3 along the length of the tool. A handle 4 is mounted to the top of the top casing part 1 and a second handle 5 extends from a side of the tool. The handle 5 is hollow and can be attached by a threaded spigot 5' to a source of compressed air. The compressed air can pass into the tool through an opening 6 in the casing part 1.

Figure 3:
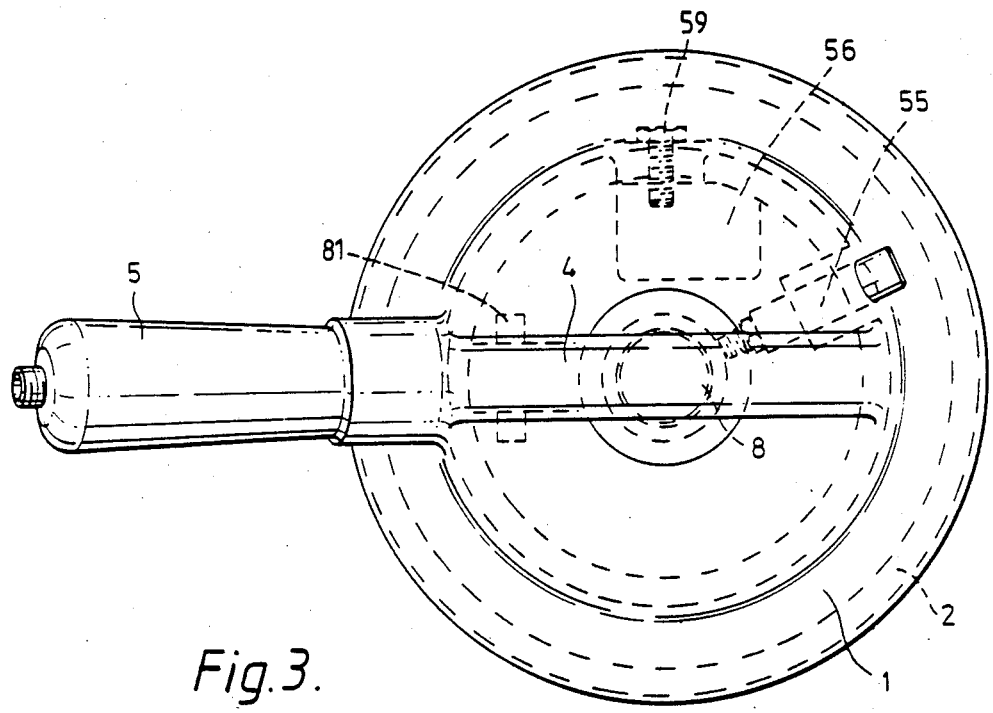
FIG. 3 is a plan of the tool shown in FIGS. 1 and 2 with some parts shown in phantom.

The upper part of the tool defines a piston/cylinder arrangement. The piston comprises a disc shaped element 7 coaxial with the axis 3 of the tool and having an axially extending spigot portion 8 which is also coaxial with the axis 3. The piston is non-rotatably mounted in the tool casing by a retaining yoke 81 (FIG. 3). The portion 8 has axially spaced bores 9, 10 together defining a valve body and joined by a frusto-conical portion 11 defining a valve seat. The portion 8 is sealed to a radially extending web 12 of the casing part 1 by an O-ring 13. The piston 7 is free to move in the axial direction, but is non-rotatable, relative to the casing 1, 2.

A valve member 14 having a frusto-conical form similar to that of the portion 11 is positioned within the bore 9 of the portion 8 on an axially extending finger 15 removably mounted to the casing part 1.

The piston 7 is bolted to a motor casing 16 having an inner cylindrical part 17 including a radially inwardly extending, annular lip 18. The piston 7 engages, via the part 17, a back plate 19 of a vane air motor 20. The motor 20 may be based on any conventional vane air motor and may deliver 4 kW at speeds up to 12000 rpm.

The air motor 20 includes a rotor 21 rotatably supported in a double row angular contact bearing 22 and a needle roller bearing 23. The rotor 21 includes an integral, axially extending part 24 having a blind bore 25. The end 26 of the part 24 is externally screw threaded to enable a chuck 27 to be mounted to it.

The motor 20 also has a speed governer 28.

Axial loads are transmitted through the rotor 21 to the bearing 22 and thence through the motor back plate 19 and the motor casing 16 to the piston 7.

A flywheel 29 is bolted to a disc-shaped support 30 secured to a rotatable drive shaft 20' of the motor 20. In another arrangement (not shown) the flywheel support could be splined to the motor 20 to allow relative axial movement between them. The flywheel suport 30 has three openings, one of which 31 is illustrated in the drawings, circumferentially spaced around the axis 3.

The motor casing 16 is sealed within the casing portion 2 by an O-shaped ring seal 32.

The motor casing 16 is urged upwardly, as seen in FIG. 1, by a compression spring 33 acting between an inner step 34 of the casing portion 2 and a radially outwardly extending flange 35 integral with the inner cylindrical portion 17.

The rotor itself is able to slide axially through a small distance relatively to the inner portion 17 of the motor casing 16. It is urged to the position shown in FIG. 1 by a circular leaf spring 36 acting between a flange 37 of the cylindrical portion 17 and an outwardly extending flange of a portion 38 of the motor 20.

Figure 7:
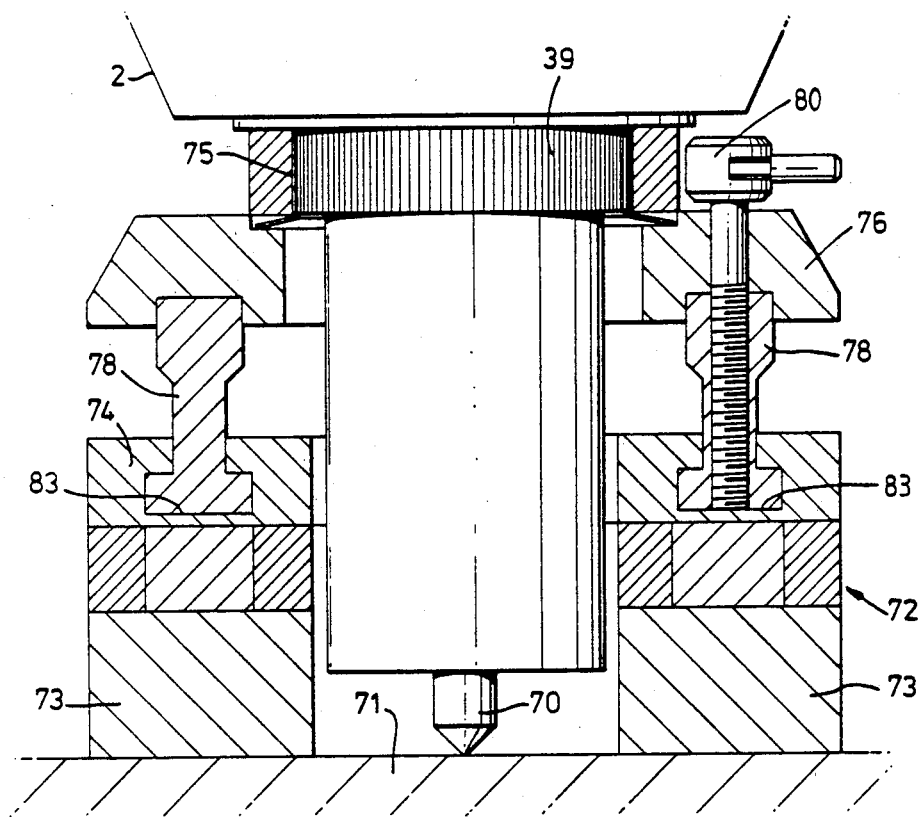
FIG. 7 is a part longitudinal section (taken on line 7—7 FIG. 8) through an arrangement for clamping the tool to a workpiece; and, FIG. 8 is a plan of the clamping arrangement with the tool omitted.

The tool operates as follows. A stud 70 (FIG. 7) is fitted into the chuck 27 which has a suitable drive configuration. For example, the chuck could have a hexagonal or bilobal form. The body of the stud passes through the chuck 27 and is housed in the blind bore 25 within the portion 24. Packing sleeves (not shown) may be fitted within the bore 25 to accommodate studs of different lengths. Alternative chucks may be screwed onto the portion 24 of the rotor 21 to accommodate different drives.

The tool is held against the surface of a carbon steel plate workpiece 71 to which the stud is to be welded by a magnetic clamp 72 into which the tool is fixed via a bayonet connector 39. In other arrangements, pipe, beam and vacuum clamps could be used.

Figure 8:
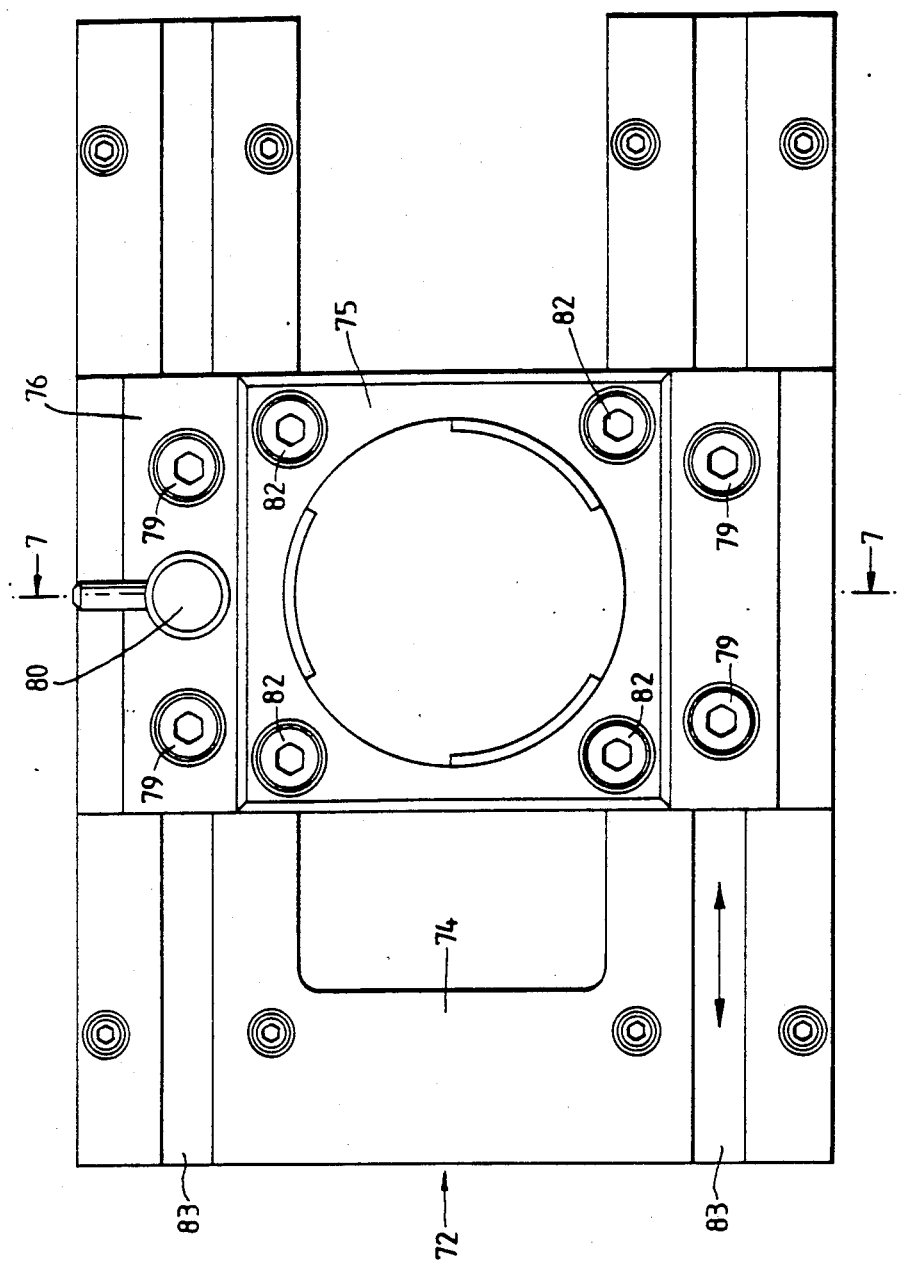

The magnetic clamp 72 (FIGS. 7 and 8) comprises a pair of bar electromagnets 73 joined together via a horseshoe yoke 74. A bayonet socket 75 which clamps to the bayonet connector 39 is secured by bolts 82 to a top plate 76 of the clamp which is in turn fixed to legs 78 by bolts 79. The position of the plate 76 relatively to the yoke can be adjusted by sliding the legs along parallel tenon slots 83 in the yoke 72 to permit a one dimensional alignment of the welding head after excitation of the electromagnets 73. This position may be clamped by means of a locking screw 80.

The tool is attached to a source of compressed air such as a 150 cfm compressor from which the compressed air is taken directly or by using the stored energy of air at 8 bars from a 170 liter receiver.

The path along which air flows from the handle 5 to the motor 20 will now be described. Air passes through the opening 6 into a cavity 40 and from the cavity 40 along a first path into the bore 10 of the axially extending portion 8 of the piston 7. The air passes through the bore 9 into a cavity 41 defined between the piston 7 and the flywheel support 30. The air then flows into a second cavity 42 defined between the flywheel support 30 and a radially extending web 43 of the motor casing 16 via the openings 31 in the flywheel support and around the edge of the flywheel. The air then flows through openings (not shown) in the motor back plate 19 and a motor packing plate 44 into the motor cage 45. The air then exhausts through apertures 46 in the wall of the motor cage 45, past the return spring 33 and out of the casing portion 2 via exhaust outlets 47 in the wall of the casing portion.

The entire control of the tool is automatic to give a single trigger actuation for the weld cycle. The weld cycle is initiated by operating a safety trigger 48 which opens a valve (not shown) to allow air to pass through the handle 5 and via the previously described path to the motor 20. The motor 20 then accelerates to its initial working speed. Air also passes along a second path through a bleed hole 49 into a cavity 50. For small diameter studs it is acceptable for this air to act directly on the piston 7 to urge the motor casing 16 relatively to the casing portion 2 against the force of the spring 33. However, this simple operation does not maximise the machine potential. In practice, it is more satisfactory for the air from the bleed hole 49 to be subject to additional control. The control system is shown diagrammatically at 51 in FIG. 1 and in more detail in FIG. 4.

Figure 4:
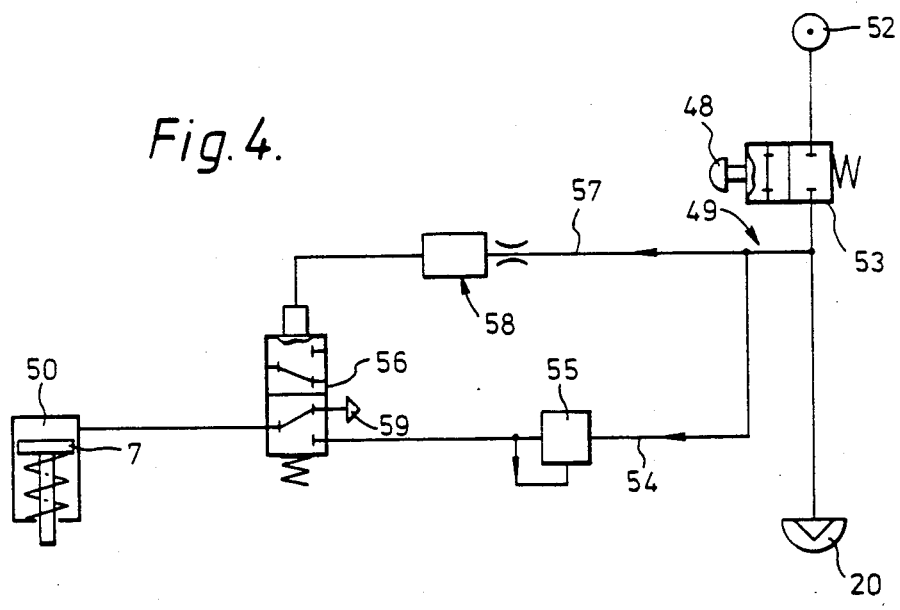
FIG. 4 is a diagram of the pneumatic control circuit.

FIG. 4 illustrates the source 52 of compressed air feeding to a start valve 53. This valve is controlled by the trigger 48. In operation, a proportion of the air supplied to the cavity 40 passes from the valve 53 through the bleed hole 49, as previously described, at which point it branches. As illustrated also in FIG. 4 the pressure applied through the bleed hole 49 is also applied directly to the motor 20 through the bore 10 etc. as previously described. One branch 54 guides air via a pressure regulator 55 to the input port of a 3-port, 2-way pilot operator spring return valve 56. The other branch communicates compressed air along a line 57 via a timer 58 to the pilot of the 3-port valve 56. Initially, the pilot air pressure is insufficient to overcome the return spring force so that the cavity 50, illustrated diagrammatically in FIG. 4, is exposed to atmospheric pressure via an exhaust outlet defined in a bolt 59 mounted in the upper casing part 1 and supporting the valve 56. After a delay of about 2 seconds determined by the timer 58, which is sufficient to enable the motor 20 to reach full speed, pilot pressure overcomes the return spring pressure thus allowing air supplied along the line 54 to communicate with the cavity 50. The incorporation of the pressure regulator 55 isolates piston forces from the effects of fluctuations in the supply pressure and permits the piston force to be adjusted with different stud sizes and conditions.

The friction welding process relies on heat generation between rubbing surfaces to provide a material flux which may be forged to produce an integral bond between the surfaces. In a typical friction welding cycle, a stud is rotated at relatively high speed while urged against a workpiece under comparatively light force for a period of time to enable sufficient heat to build up the form of flux whereupon rotation of the stud is stopped and the stud is urged against the workpiece under a much larger, forging pressure. In this example a single ram pressure is employed throughout the operation.

Figure 2:
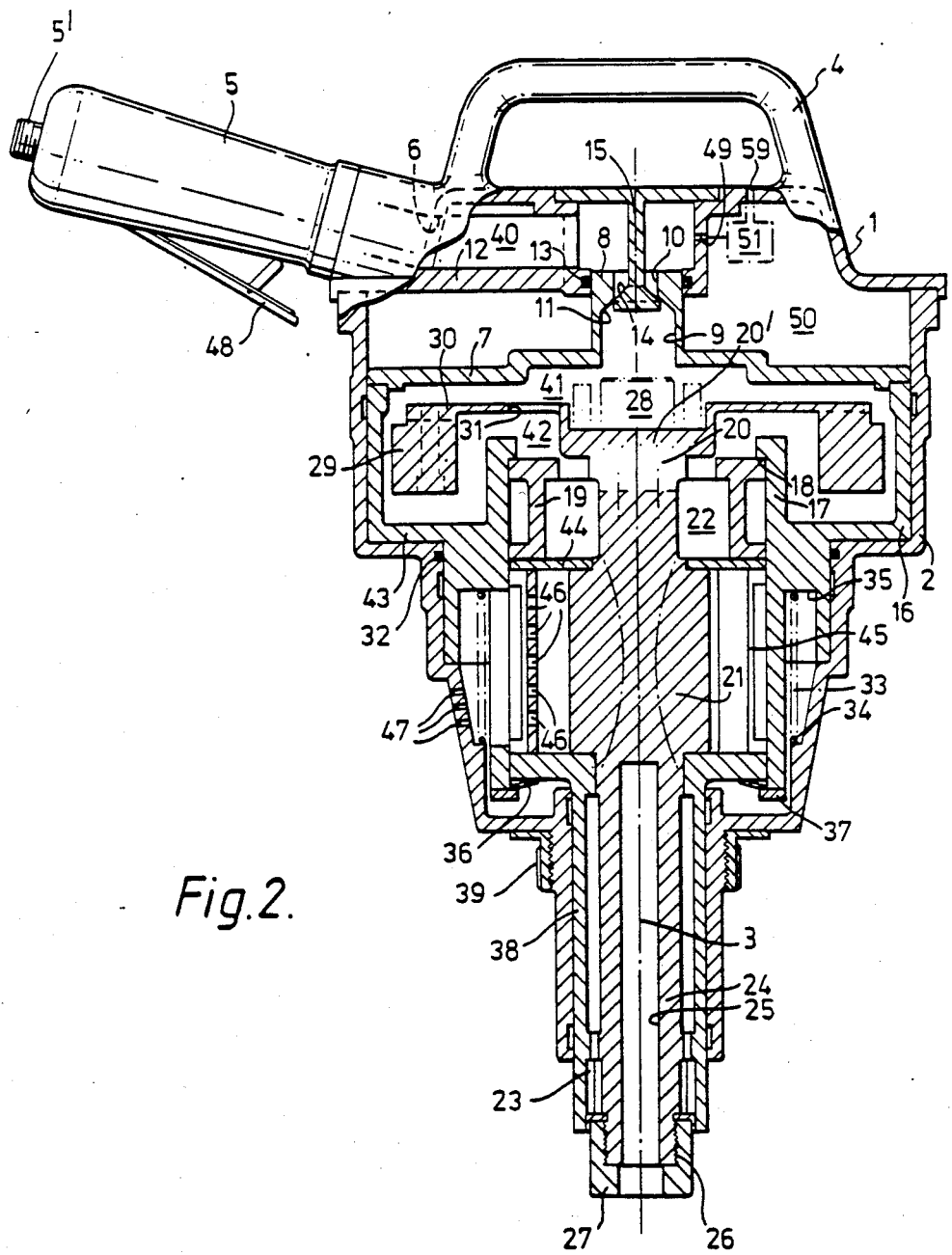
FIG. 2 is a view similar to FIG. 1 but illustrating the tool in its extended position.
Figure 5:
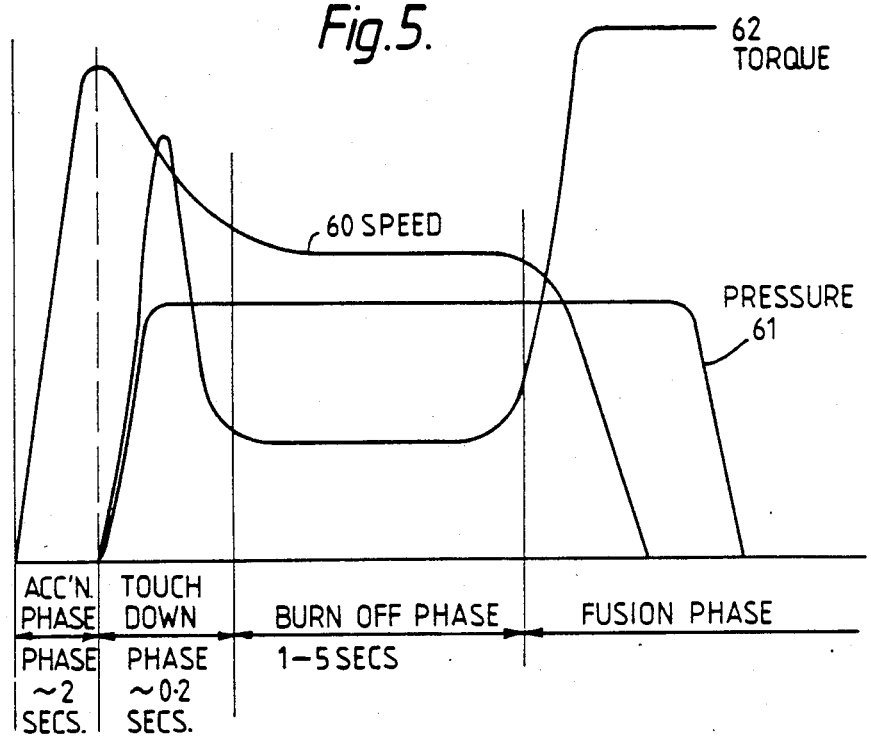
FIG. 5 illustrates graphically the relationship between torque, pressure, and speed experienced during a stud friction welding cycle.

Lines 60, 61, and 62 on FIG. 5 illustrate typical variations in rotational speed, applied pressure and resistive torque during the weld cycle. With reference to FIG. 4 the valve 48 is opened and air is supplied to the motor which then rapidly accelerates to maximum speed storing energy in the flywheel. After a time delay of typically 2 seconds the valve 56 switches an air supply from the line 54, via the regulator 55 to the ram 50 providing a ram force which is essentially constant throughout the weld cycle. Thus initial contact (touchdown) between the workpiece and the stud occurs only after the motor has accelerated to working speed. During touchdown high resistive torques are encountered which may exceed the driving torque of the motor. At this time the rotational speed of the motor and flywheel decreases and energy is drawn from the flywheel to contribute to the establishment of a region of softened material (flux) between the fraying surfaces. As the flux is established the resistive torque falls to equal the driving capacity of the motor after which time the rotational speed remains substantially constant and the motor along supplies energy for the continuation of the burn off phase. During the axial movement of the piston the valve seat 11 slowly approaches the valve member 14 until eventually the valve closes preventing any further air communicating with the motor 20 (FIG. 2). At this point the motor ceases to rotate and weld fusion occurs. The valve 48 is now closed, interrupting the air supply to the cylinder and completing the weld cycle.

It will thus be seen that the tool automatically controls the way in which the rotational speed and pressure applied to the stud vary during the weld cycle without any operator intervention.

One of the critical factors in this control is the duration of the burn-off phase. This can be varied by changing the initial relative position between the valve seat 11 and the valve member 14 by, for example, changing the length of the finger 15.

A further problem when stud welding is that there is a wide variation in frictional torque through the weld cycle as is shown in FIG. 5 by a line 62. On initial contact of the rubbing surfaces there is a relatively high frictional torque which persists until a flux of hot metal has been established. In a satisfactory weld cycle this high torque lasts for a short period of time, say 0.2 seconds. When the flux is established the resistive torque falls to a level during the burn-off phase which may typically be 25% of the initial peak torque. During this phase axial pressure is maintained on the stud and stud material is "burnt off" adding to the flux. The burn off phase continues until the driving torque is removed. At this time, as previously explained, the flux cools, the weld fuses and resistive torque increases.

In order that the tool is portable it is made of lightweight materials and the rotating components of the motor 20 and the stud holding assembly thus have an inherently low inertia. This is not helpful when attempting to deal with the problems of high initial torque described above.

To deal with this problem, the flywheel 29 is provided. Energy is stored in the flyweel, 29 during the initial acceleration of the motor 20. On engagement of the stud with the workpiece, the load on the motor 20 will suddenly increase due to dry friction between the stud and the workpiece. However, due to the energy previously stored by the flywheel 29, this extra load will be overcome so that the stud will continue to rotate but at a lower speed. Typically a speed loss of about 20% of the maximum speed will occur (see line 60 in FIG. 5). It is important to note that the inertia is not, as in the case of conventional inertia welding, used to supply all the welding energy but is used to boost the air motor 20 during the initial (touchdown) phase of welding. In this manner, the capacity of the tool is substantially increased compared with a unit relying wholly on the motor power of the energy input at the time of welding. The quantity of inertia employed may be varied depending upon the type of stud to be welded.

Figure 6:
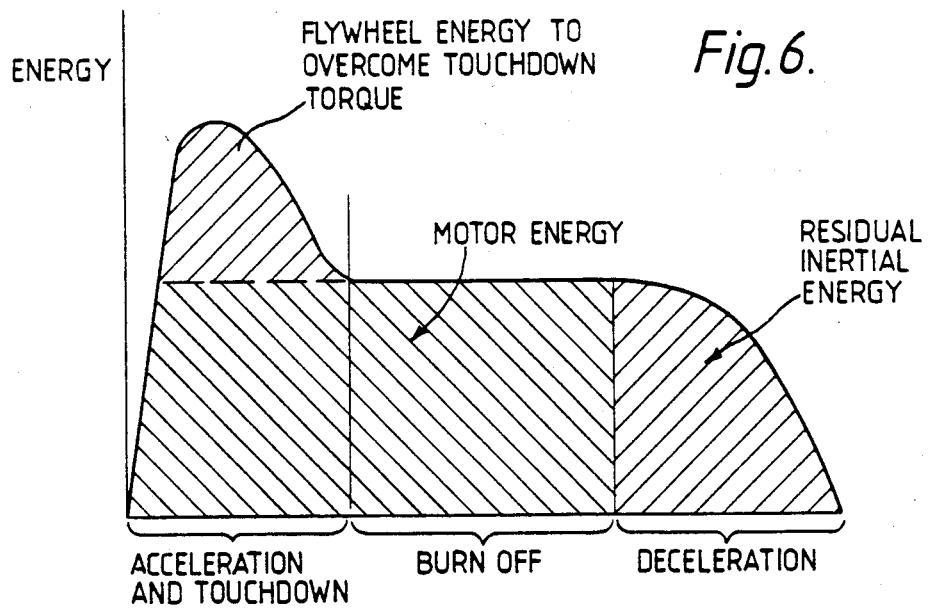
FIG. 6 illustrates graphically the energy supply to the drive shaft of the drive motor of the tool shown in FIGS. 1 and 2 during the weld cycle.

FIG. 6 illustrates the energy supplied to the stud to rotate the stud during a weld cycle. Contact (touchdown) between the stud and the workpiece takes place about 2 seconds after acceleration is initiated as shown in FIG. 6 and it will be seen that very shortly thereafter there is a requirement for the extra inertial energy stored by the flywheel 29. However, this requirement ceases after the resistive torque has been overcome and there is then a fairly constant energy requirement indicated by a section 63 of the graph. Finally, when the air supplied to the motor 20 is being cut off the driving energy will gradually be decreased to zero as the residual inertial energy is dissipated.

In some cases, it may be desirable to include transducers for monitoring motor speed, piston pressure, and stud displacement. In this case, the output from the transducer may be stored via a microcomputer at the time of welding and may be then compared with standard results to enable a non-destructive assessment of weld quality to be obtained.

It will be noted that if the clamping arrangement should fail during welding, the air pressure will immediately force the piston 7 to the FIG. 2 position thus stopping the motor 20. This is an important safety feature.

We claim:

1. A method of friction welding, the method comprising causing relative rotation between a pair of workpieces (70,71) by actuating first and second drive means (20,29), the first drive means (20) being coupled to a primary source of energy, and the second drive means being adapted to store auxiliary energy; bringing the workpieces (70,71) into contact with one another under pressure, whereby the first and second drive means are adapted together to supply sufficient rotational energy to overcome the effects of restrictive torque between the workpieces on initial contact between the workpieces; and thereafter continuing actuation of the first drive means (20) to maintain relative rotation between the workpieces (70,71).

2. A method according to claim 1, further comprising the step of subsequently stopping the first drive means (20) to stop relative rotation between the workpieces (70,71) after sufficient heat is built up at the interface between the workpieces and then urging the workpieces together under forging pressure.

3. A method according to claim 1, further comprising prior to bringing the workpieces into contact, causing the second drive means (29) to store a predetermined amount of energy.

4. A method according to claim 1, further comprising mounting one workpiece (70) to the first and second drive means (20,29); and mounting the first and second drive means (20,29) to the other workpiece (71) prior to actuating the first and second drive means.

5. Friction welding apparatus comprising first drive means (20) adapted to be coupled to a primary source of energy; second drive means (29) adapted to store auxiliary energy, the first and second drive means being adapted to cause relative rotation between a pair of workpieces (70,71); and means (7) for urging the workpieces into contact with one another, the first and second drive means (20,29) being adapted together to supply sufficient rotational energy to overcome the effects of resistive torque between the workpieces on initial contact between the workpieces, and the first drive means (20) being adapted thereafter to maintain relative rotation between the workpieces (70,71).

6. Friction welding apparatus according to claim 5, wherein the apparatus is portable.

7. Apparatus according to claim 5, wherein the first and second drive means (20,29) are coupled to a common rotatable member adapted to support a workpiece (70).

8. Apparatus according to claim 7, wherein the second drive means comprises a flywheel (29) coupled to a drive shaft (20') of the first drive means (20) for rotation with the drive shaft.

9. Apparatus according to claim 8, wherein the flywheel (29) is mounted coaxially on the drive shaft (20').

10. Apparatus according to claim 8, wherein the apparatus includes a housing (1,2) supporting the first drive means, the drive shaft (20') of the drive means (20) being axially movable relative to the housing, and wherein the flywheel (29) is also axially movable relatively to the housing.

11. Apparatus according to claim 5, further comprising timing means (56) for delaying activation of the urging means (7) until the first drive means has reached a predetermined speed.

12. Apparatus according to claim 7, wherein said first and second drive means are coupled by fixed transmission ratios to said common rotatable member.

13. Apparatus according to claim 5, wherein said first drive means comprises a fluid operating motor.

* * * * *